April 18, 1961 F. PETERS 2,980,745
COUNTERELECTROMOTIVE-FORCE CELL
Filed May 2, 1958 5 Sheets-Sheet 1
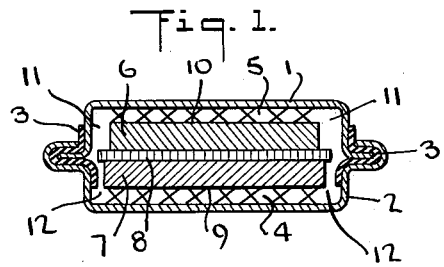
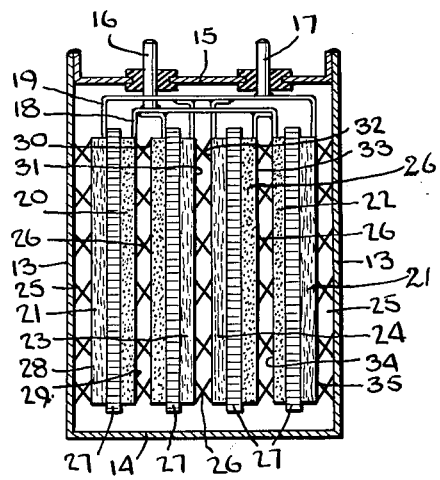
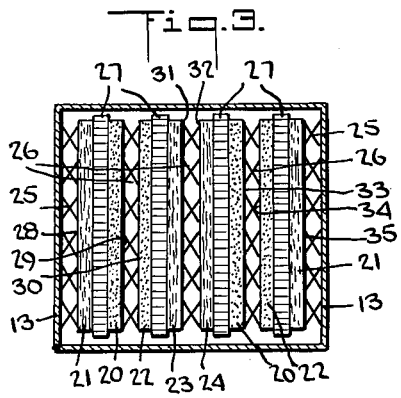
INVENTOR.
FREIMUT PETERS
BY
AGENT April 18, 1961 F. PETERS 2,980,745
COUNTERELECTROMOTIVE-FORCE CELL
Filed May 2, 1958 5 Sheets-Sheet 2

INVENTOR.
FREIMUT PETERS
BY
AGENT

April 18, 1961   F. PETERS   2,980,745
COUNTERELECTROMOTIVE-FORCE CELL
Filed May 2, 1958   5 Sheets-Sheet 3
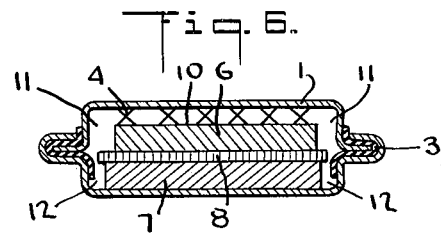
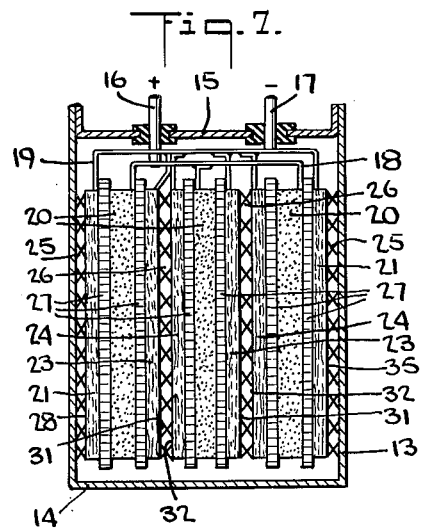
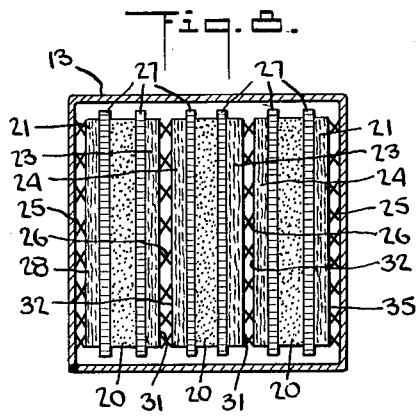
INVENTOR.
FREIMUT PETERS
BY
AGENT

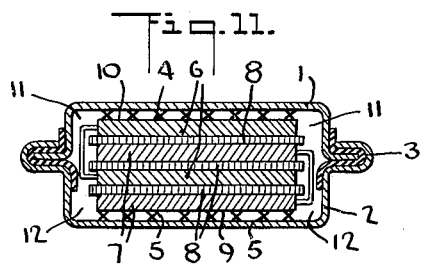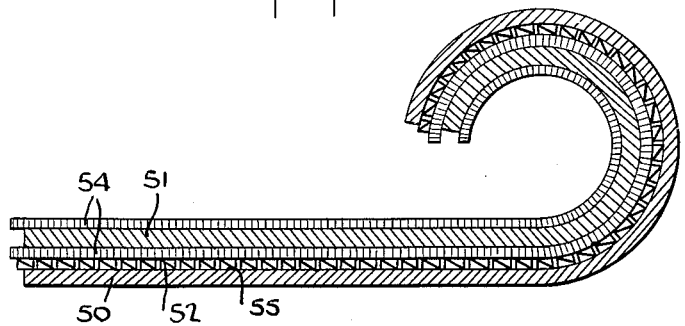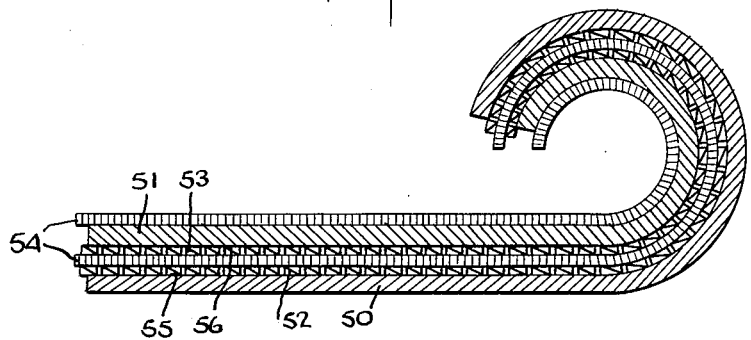

April 18, 1961 F. PETERS 2,980,745
COUNTERELECTROMOTIVE-FORCE CELL
Filed May 2, 1958 5 Sheets-Sheet 5

INVENTOR.
FREIMUT PETERS
BY
AGENT

United States Patent Office

2,980,745
Patented Apr. 18, 1961

2,980,745

COUNTERELECTROMOTIVE-FORCE CELL

Freimut Peters, Hagen, Westphalia, Germany, assignor to Accumulatoren-Fabrik A.G., Hagen, Westphalia, Germany, a corporation of Germany Filed May 2, 1958, Ser. No. 732,512

8 Claims. (Cl. 136—1)

The present invention relates to hermetically closed electrolytic counterelectromotive-force cells of potentially changeable polarity with electrodes which are substantially free of active material. For brevity's sake, such counterelectromotive-force cells will be designated hereinafter in the specification and the annexed claims as "counter cells."

Battery counter cells as such are known. In one conventional form, they comprise sintered nickel plates with thin separators therebetween. The plate electrodes and separators are highly compressed to cause intimate electrolytic contact between all parts, whereby gassing is eliminated when current passes through the cell. This enables the cell to be hermetically sealed and constitutes an advantage over open battery cells. However, the required high compression between the cell elements is a considerable disadvantage during manufacture. In addition, the pressure easily damages the thin separator. Such damage may lead to short-circuiting during operation of the cell. Furthermore, experience has shown that, despite theoretical considerations to the contrary, gases actually evolve when current passes through the cell. The accumulating gas finally creates sufficient internal pressure to damage or destroy the hermetical seal of the cell.

In another type of battery cell, the gas evolved at one electrode during operation is consumed at the other electrode. These cells, however, are not cells of changeable polarity but cells with a negative electrode containing a negative active material while the positive electrode is formed substantially without any active material.

Counter cells without active electrode material have the advantage of being useful for many purposes that cannot be obtained with other types of cells. Because they contain no active material, they reach the final value of their countervoltage which opposes the potential of the main battery practically instantaneously upon application of the current, which is of considerable importance in many circuits.

It is one object of the present invention to provide hermetically sealed counter cells of potentially changeable polarity which operate dependably for a long period of time and the seal of which is not subject to excessive internal pressure.

It is another object of this invention to provide cells of this type, which may be manufactured economically and without the need for complicated compression procedures.

It is a further object of the present invention to provide counter cells of the afore-mentioned type, in which the danger of shortcircuiting is effectively eliminated.

Other objects of the present invention and advantageous features thereof will become apparent as the description proceeds.

As compared to open battery cells and to hermetically sealed cells with negative active material in the negative electrode, the counter cells of potentially changeable polarity of the present invention eliminate active material, which simplifies the manufacture in addition to the operating advantages it provides.

Accordingly, it is the principal object of the present invention to provide an effective hermetically sealed counter cell of potentially changeable polarity with electrodes without active material.

The above and other objects and advantages are accomplished in accordance with the present invention by providing a hermetically sealed battery cell comprising at least two metal electrodes of potentially different polarity, a separator between each two adjacent electrodes of potentially different polarity, an electrolyte fixed in the separator and the electrodes by capillary action, the cell defining interior gassing chambers adjacent surface portions of the electrodes which are not covered by the separator, said surface portions being electrically connected with the electrodes and having an enlarged gas-contacting area in contact with the fixed electrolyte and the evolving gases in the gassing chambers for consuming said evolving gases, and a gas atmosphere in the cell, said atmosphere consisting at least primarily of oxygen at the time the cell is hermetically sealed.

A cell of this type may have an alkaline or an acid electrolyte. It has no polarity, i.e. current may flow through the electrodes in either direction. Since the electrodes are practically free of active material, the cell reaches the maximum value of counter-voltage opposed to the potential of the main battery almost immediately upon applying the current. As current flows through the cell, oxygen is liberated at the positive electrode and is consumed at the gas-contacting area of the negative electrode while evolution of free hydrogen at the negative electrode is inhibited. For this purpose, it is necessary for the oxygen produced at the positive electrode to be able to contact the negative electrode. This is accomplished by providing gassing chambers in the cell and, furthermore, by making arrangements that the gas-contacting areas of the electrodes are in contact with the electrolyte, i.e. coated with a film of electrolyte, and the evolving gases.

The enlarged area of the gas-contacting surface portions of the electrodes assure proper gas adsorption and, in this respect, it is particularly advantageous to form these gas-adsorbing areas as electrode surface portions which are not covered by the separator.

It is important that the cell contain an atmosphere consisting primarily or exclusively of oxygen when it is hermetically sealed. The gaseous reaction in the cell is a reduction process and it is, therefore, preferred to keep other gases out of the cell, particularly such gases, as nitrogen and the like, whose molecules block reduction on the surface of the contact surface portions.

The formation of the oxygen atmosphere in the sealed cell may be attained by any suitable conventional procedure, for instance, by introducing oxygen into the cell or by adding thereto any of the well-known oxygen-yielding substances, such as sodium peroxide, potassium peroxide or other peroxides or potassium hypobromide (KOBr).

In accordance with one preferred embodiment of the invention, the gas-contacting surface portions consist of roughened or sintered nickel, or they are plated with nickel. The advantage of sintered metals is their relatively large surface area in a small space.

According to another preferred feature, the electrodes are metal plates having one surface covered by the separator while the opposite surface forms the gas-contacting surface portion of the electrode. Alkaline cells may, for instance, contain sintered nickel electrode plates.

In yet another preferred embodiment of the counter cell, the separator has very fine pores impregnated with electrolyte fixed in the capillaries of the separator and is embedded under moderate pressure between two adjacent electrode surfaces so that gas bubbles may escape into the gassing chambers by passing between electrode and separator laterally but cannot penetrate through the separator. This has the advantage that the evolving gases (oxygen) are conducted toward the gas-contacting surfaces and away from the electrode surfaces, which enables the current to be more efficiently conducted through the electrolytic paths than when these paths are also used to transport gas.

In one embodiment of the invention, only one electrode has gas-contacting portions associated therewith. This arrangement is advantageous with cells which are so positioned in an electric circuit that the current flows therethrough always in the same direction. This further simplifies manufacture and constitutes merely a specific use of the general principle of the invention, as applied to counter cells of potentially changeable polarity.

According to a further preferred embodiment of the present invention, the electrodes are thin plates which, due to their thinness, give a very large effective surface. In some cases, sheet- or foil-like electrodes may be used the inner resistance of which is extremely low and which, due to such a low inner resistance, have an especially high stabilizing and smoothing effect. Such cells permit a correspondingly high reactive current. Thin electrodes of this type may be produced by any conventional method and may have a gage between 0.1 mm. and 2 mm. for instance, of 0.2 mm. to 0.3 mm. The separators are then correspondingly thin.

However, the electrodes useful in the cells of the invention may also have a conventional gage of up to about 3 mm. or 4 mm. although the very thin electrodes are the preferred ones.

The invention will be more fully understood by reference to the following detailed description of certain preferred embodiments thereof, taken in conjunction with the drawings annexed hereto, wherein Fig. 1 is a vertical section of a button- or disc-like cell according to the present invention;

Fig. 2 is a longitudinal section of a cell of quadrangular cross section;

Fig. 3 is a top view of the cell of Fig. 2;

Fig. 6 is a vertical section of a different embodiment of a counter cell according to the present invention;

Fig. 7 is a longitudinal section of a different embodiment of a cell according to the present invention;

Fig. 8 is a top view of the cell of Fig. 7;

Figs. 9 and 10 illustrate different embodiments of flexible electrode arrangements similar to those of Figs. 4 and 5, respectively;

Fig. 11 is a vertical section of yet another embodiment of a counter cell according to the present invention with several thin electrodes;

Figure 4:
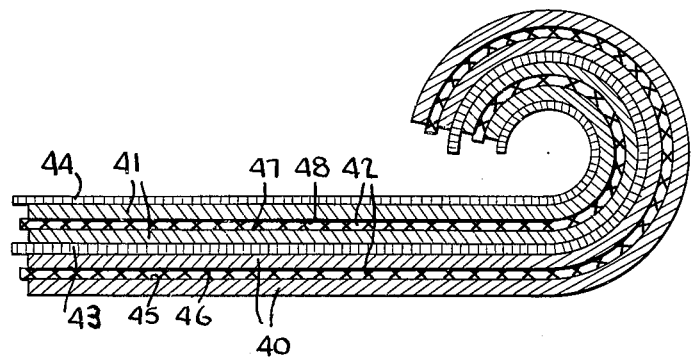
Fig. 4 illustrates an arrangement of flexible electrodes which are spirally wound.

Figs. 1 to 4, 10, and 11 are embodiments of cells wherein gas-contacting surfaces are associated with the electrodes of both polarities and which are useful for current flow in either direction. Figs. 5 to 9, 12, and 13 constitute embodiments in which gas-contacting surfaces are associated only with the electrode or electrodes of one polarity.

Referring now to Fig. 1, there is shown a flat cell housing consisting of upper housing part 1 and lower housing part 2. The housing is of any suitable metal, such as nickel plated steel or nickel, for instance, and for reasons hereinbelow explained, the two housing parts are insulated from each other by insulating inserts 3. Any conventional insulating material may be used, such as natural or synthetic rubber, plastics, for instance, polyamide or polyvinyl chloride resins, and like electrically insulating materials.

Two electrodes 6 and 7 are mounted in the cell housing, with separator 8 embedded between the electrodes. Preferably, the electrodes and the separator are porous. The separator may suitably consist of a mat or web of any non-conductive fibrous material or of a filter paper of cellulosic or synthetic fibers, or of a semi-permeable pellicle of cellulose or plastic, or of a microporous plastic membrane, or a combination of these different layers. The invention is not concerned with the specific separator or electrode materials. The only essential feature of the separator is its permeability for the electrolyte. On the other hand, it is preferably so constructed as to be impermeable to the gas bubbles created during operation of the cell.

Preferably, the porous electrodes 6 and 7 are sintered metal electrodes, such as sintered nickel electrodes which are well known per se and which provide a very large active surface. More particularly, the effective surfaces of the electrodes are the outside surfaces 9 and 10 which serve for the electrochemical gas reaction. Therefore, these surfaces must be in contact or communication with the gassing chambers and must be coated with a thin electrolyte film.

Access to the surfaces 9 and 10 is obtained by providing spacers 4 and 5 between the surfaces and the walls of the cell housing. As shown, the spacers are support frameworks with large interspaces. They may be either of electrically conductive material, such as a metal, or they may be non-conductive, i.e., of plastic or the like. If the spacers are metallic, their surfaces will aid in the adsorption and consumption of the evolving gases (oxygen). Metallic spacers will also electrically connect the electrodes with the cell housing. In this case, the housing parts are separated by insulation 3 to avoid short-circuiting and the housing parts 1 and 2 may be used directly as the positive and negative terminals for the cell.

It is particularly advantageous to make at least one of the spacers resilient. This will not only produce a more reliable electrical contact between the electrically connected cell parts but it will also exert only a moderate pressure of the inner surfaces of the electrodes against the separator so that gas bubbles will more readily escape laterally between the electrode and the separator into the gassing chambers rather than to penetrate through the impregnated pores of the separator.

The gassing chambers in the cell include the spaces 11 and 12 which, however, are of smaller volume and effectiveness than the spaces formed by the spacers 4 and 5.

The square cell of Figs. 2 and 3 is constructed according to the same principles as the flat disc cell of Fig. 1. The cell housing consists of bottom 14 side walls 13, and sealing cover 15. Preferably, all housing parts are of metal. The terminals 16 and 17 of positive and negative polarity, respectively, are mounted in cover 15 and are insulated therefrom. Electrical conductors 18 and 19 in the interior of the cell connect respective ones of the terminals or lead-ins with their associated electrodes, lead-in 16 being connected to the two electrode pairs 20 and 22 while terminal 17 is connected to electrodes 21, 23, and 24. As shown in their preferred embodiment, the electrodes are sintered metal plates which are highly porous. Between the outermost electrodes 21 and the housing walls 13 there are provided spacers 25 while spacers 26 are mounted between electrodes 20 and 22 and between electrodes 23 and 24. The spacers are substantially identical with the spacers of Fig. 1. With metallic spacers, the outer electrodes are electrically connected with the housing while adjacent electrodes of the same polarity are also electrically interconnected. Thus, electrodes 20, 22 and 23, 24 form double electrodes interspaced by the respective spacers.

Separators 27 are embedded between electrodes of different polarity, i.e., between plates 21 and 20, 22 and 23, 24 and 20 as well as 22 and 21. The separators and their mounting are similar to the arrangement described in connection with Fig. 1. As in this embodiment, the back sides of the electrodes which are not covered by the separators and which face away from the electrodes of different polarity are held readily accessible to evolving gases in the cell by the spacers 25 and 26. These gas-contacting surface portions 28 through 35 with their enlarged areas serve for the electrochemical reaction of the gas so that they form the actually effective electrode surfaces in respect of the gas adsorption. These gas-contacting surfaces which are in communication and contact with the gassing chambers must be coated with a thin film of electrolyte to make the electro-chemical process possible.

Fig. 4 illustrates a spirally wound electrode arrangement with very thin and flexible electrodes. This arrangement comprises a pair of electrodes 40 of one polarity and a pair of electrodes 41 of the opposite polarity. Spacers 42 hold apart the electrodes of each pair while porous separators 43 and 44 are respectively embedded between adjacent electrodes 40 and 41, and covers the innermost electrode 41. In every other essential respect, the electrode, spacer and separator arrangement is similar to that of the other embodiments and the gas-contacting surface portions 45 through 48 are again held free to adsorb evolving gases by spacers 42.

Figure 5:
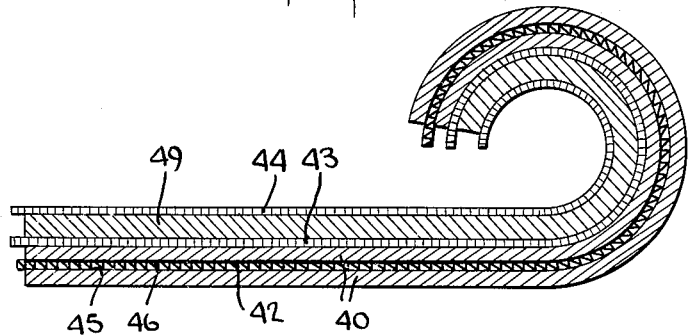
Fig. 5 shows an arrangement somewhat similar to that of Fig. 4.

In the slightly different embodiment of Fig. 5 where like reference numerals indicate the same parts as in Fig. 4, the electrode of one polarity is a single electrode 49 instead of being formed as a double electrode. Preferably, the single electrode has positive polarity. In this case, the consumption of evolving oxygen during the current flow through the cell is effected at the surfaces 45 and 46 of the double electrode of negative polarity.

The cell of Fig. 6 being quite similar to that of Fig. 1, like reference numerals indicate like parts in the two embodiments. In the embodiment of Fig. 6 one of the spacers is omitted so that electrode 7 contacts the housing part 2, offering no free gas-contacting surface. Similar to the corresponding arrangement of Fig. 5, the electrode 7 is preferably given positive polarity while electrode 6 has the negative polarity. In this case, too, oxygen consumption will take place at the free surface 10 of the negative electrode.

Figs. 7 and 8 illustrate cells of a structure similar to the cell of Figs. 2 and 3, like reference numerals indicating like parts. As in the embodiment of Fig. 6, one of the spacers is omitted, electrodes 20 being constructed as single electrodes and being preferably of positive polarity. The cell has a total of three positive electrodes and six negative electrodes 21, 23 and 24, the free back sides 28, 31, 32, and 35 of the negative electrodes serving as gas-contacting surfaces. In all other respects, the cell is constructed and operates like the cell of Fig. 2.

Figs. 9 and 10 illustrate other embodiments of wound electrodes of thin, flexible sheets of metallic material. Referring to Fig. 10, there is provided an electrode 50 of one polarity and an electrode 51 of the opposite polarity, with metal spacers 52 and 53 arranged along the electrode sides facing each other. A separator 54 is mounted between the spacers and another such separator covers electrode 51. The metal spacers may be of nickel or nickel-plated iron and should have large apertures or interspaces to permit free access of gas to the electrode surfaces 55 and 56 which serve as the gas-contacting areas. The metal spacers may be wire mesh or sieve-like structures, expanded metal elements, and the like.

The layers may obviously be slightly rearranged, for instance, in the following order: metal spacer, electrode, separator, counter-electrode, metal spacer and separator. The operation of this cell will be self-evident from a consideration of the other and basically similar embodiments.

In the similar cell of Fig. 9, like reference numerals are applied to like parts. In this case, the spacer 53 is eliminated so that only surface 55 of electrode 50 serves as gas-contacting surface. Preferably, this is the negative electrode while 51 is the positive electrode of the cell.

The cell of Fig. 11 is similar to the cell of Fig. 1 and like parts therein are indicated by like reference numerals. The difference between the two embodiments lies in the fact that the cell of Fig. 11 has a double electrode of one polarity and a double electrode of the opposite polarity, each pair of electrodes being interconnected. This arrangement increases the electrode surface and reduces the current density. Therefore, such cells can be charged with a higher rate of current than the cells of Fig. 1.

The cell of Fig. 11 may be further improved by subdividing one or more of the electrodes of one polarity or of both polarities into double electrodes spaced apart by spacers to provide additional gas-contacting electrode surface portions. Since the increase in contact area reduces the gas pressure in the cell, such cells may be charged with even higher rates of current than the cell of Fig. 11.

Figure 12:
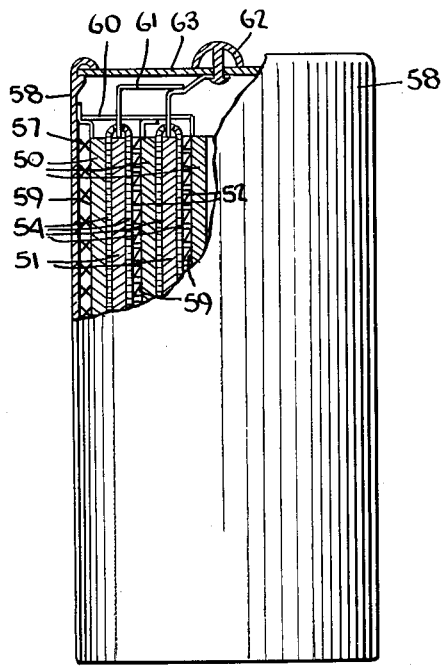
Fig. 12 is a side view of a cylindrical cell, partially in section along the cylinder axis.
Figure 13:
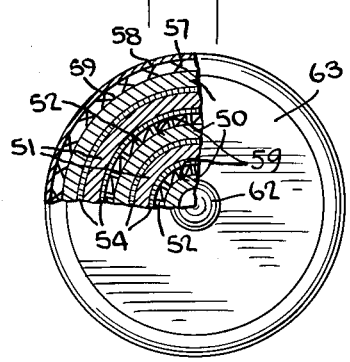
Fig. 13 is a top view of the cell of Fig. 12, partially in section to show a portion of the spirally wound electrodes.

Figs. 12 and 13 illustrate an accumulator containing an electrode arrangement according to Fig. 9. The preferably negative electrode 50 forms the outer winding and is separated from the pressure-resistant metal housing 58 by spacer 57. The separators 54 cover the surfaces of the positive electrode 51. The electrode surfaces 59 of the spirally wound electrodes 50 serve as the oxygen-consuming contact areas. The electrode 50 is electrically connected with the housing by conductors 60 while the positive electrode 51 is connected with the contact button 62 by means of conductors 61. The contact button is insulated by being mounted in the plastic cover 63 of the cell. The cover is held in place and hermetically seals the cell by means of the beaded rim of the housing wall, as illustrated. Obviously, the electrode arrangements of Figs. 4, 5 or 10 may equally be mounted in a spirally wound roll in a pressure-resistant cell according to Figs. 12 and 13.

All the electrodes of the battery cells illustrated are practically free of active material and the atmosphere in the cell consists exclusively or primarily of oxygen when the cells are sealed.

While certain preferred embodiments of the counter cells according to the present invention have been described and illustrated, it will be understood that many modifications and variations may occur to the skilled in the art, particularly after benefiting from the present teaching, without departing from the spirit and scope of the invention as defined in the appended claims.

The term "cell of potentially changeable polarity" used herein and in the claims annexed thereto is use for brevity's sake and designates a cell with electrodes of potentially different polarity. Such a cell, as stated hereinabove, has no polarity, i.e. current may flow through the electrodes in either direction.

Following more detailed examples and data on the dimensions, the composition, and other properties of the electrodes, separators, spacers, electrolytes, and the like are given without, however, limiting the present invention thereto.

Electrodes used in alkaline cells according to the present invention are, for instance, of a thickness of 0.5 mm. to 2.0 mm. They consist, for instance, of one or more individual plates of a width of 12 mm. to 15 mm. and are composed of perforated nickel-plated steel sheet material. The ratio of perforation openings to non-perforated area is about 10:90.

Wire gauze having 3,600 meshes/sq. cm. to 10,000 meshes/sq. cm. wherein the ratio of meshes to metal surface projected on a basal plane is about 60:40, is also used.

The length of the individual electrodes depends on the size of the cells used. A length of 50 mm. is quite useful.

Each cell must, of course, contain at least one positive and one negative single electrode. The number of the electrodes in each cell is limited with respect to its highest number by the intensity of the current flowing through the cell. Of perforated nickel-plated steel electrodes of a thickness of 0.5 mm., a width of 12 mm., and a length of 50 mm. with a ratio of perforations to non-perforated area of 10:90 as they are used in cells illustrated in the annexed drawings there are required 5 negative and 4 positive electrodes to generate a steady current between 100 ma. to 200 ma. It is, of course, understood that the present invention is not limited to such electrodes and electrode compositions and sizes.

Suitable other electrodes which can be used as advantageously as the perforated nickel-plated steel electrodes described hereinabove are foil-like porous sintered frames of nickel powder of a thickness between 0.1 mm. and 0.5 mm. Depending upon the size of the cell there may be used a smaller or larger number of such sintered nickel foils to provide a set of electrodes as illustrated in Figs. 2, 3, 7, and 8.

The size of the cell housing is, for instance, 40 mm. x 20 mm. x 35 mm. Another suitable size is, for instance, 35 mm. x 20 mm. x 80 mm., i.e. about twice the size of the first mentioned cell housing.

Electrodes which have proved to be suitable for the button- or disc-like cells of Figs. 1 and 6 consists, for instance, of sintered nickel electrode plates of a thickness of 0.1 mm. to 0.5 mm. The cell housing has preferably a diameter of about 25 mm. and a height of about 2 mm. The cell size may, of course, vary, and cell housings of a diameter of about 40 mm. and a height of about 8 mm. are also employed.

The electrodes of Figs. 4, 5, 9, 10, 12, and 13 consist preferably of thin foil-like sintered nickel plates of a thickness between about 0.1 mm. and about 0.4 mm. The width of such sintered nickel strips is between about 10 mm. and about 80 mm. These foil-like sintered nickel plates are spirally wound, after the separators and spacers have been placed therebetween as described hereinabove. The wound electrode spiral has a diameter between about 10 mm. and about 30 mm.

With a diameter of the spirally wound electrode arrangement of 10 mm. to 12 mm. the length of the thin sintered electrode plates is about 75 mm., with a diameter of about 30 mm. their length is about 450 mm.

The separators used in cells according to the present invention have a thickness between about 0.1 mm. and about 0.4 mm. They consist of a single or of several layers of tightly woven textile material. Microporous membranes of plastic material, for instance, of polyamide, polyethylene, polyvinyl chloride, foils of regenerated cellulose or polyvinyl alcohol, or filter paper-like webs of cellulose or said plastic materials may also be used.

The preferred mean radius of the pores of such separators varies. It is, for instance, in Textile webs: Between about $5\mu$ and about $50\mu$;
Microporous plastic foils: Between about $0.1\mu$ and about $10\mu$;
Foils of regenerated cellulose or polyvinyl alcohol: In the dry state they are substantially free of pores; they swell in the electrolyte and, due thereto, permit passage of current;
Filter paper-like webs and materials: Between about $1\mu$ and about $50\mu$.

If desired, two or more of such separator materials may be combined.

As explained hereinabove, the dimensions of the separators are dependent on the size of the electrodes as is shown in the drawings. The separators of button- or disc-like cells, for instance, have a diameter between about 25 mm. and about 40 mm. The width of separators used between spirally wound electrodes is, for instance, between about 10 mm. and about 80 mm.

The preferred electrolyte consists of aqueous potassium hydroxide solution of a density of about 1.20 to about 1.25. The amount of electrolyte, of course, is dependent on the size of the cells. The cells contain sufficient amounts of electrolyte so that the electrodes and separators are impregnated therewith but only as much as is retained by capillary action in the pores of the electrodes and separators. For instance, button- or disc-like cells of a diameter of 25 mm. and a thickness of 8 mm. contain about 1000 mg. of said potassium hydroxide electrolyte solution.

The metallic spacer means between the split electrodes and/or the outer surfaces of the electrodes and the cell housing are, for instance, as stated hereinabove, wide-meshed wire gauze, sieve-like structures, expanded metal and the like of nickel or nickel-plated iron. The thickness of such spacer means is preferably between about 0.3 mm. and 0.5 mm. Of course, non-conductive plastic material of similar structure may also be used if electrical connection between the electrodes and the cell housing is to be avoided.

When making use of the present invention for lead accumulator counter cells, the electrodes consist of non-formed, preferably perforated, lead foils of about the same dimensions as given hereinabove for cells having an alkaline electrolyte. The electrolyte is sulfuric acid of a density between about 1.20 and about 1.25. It is, of course, understood that the housing, the separators, and the spacer means must be resistant against sulfuric acid. The housing, for instance, is composed of plastic material or of lead-plated metal.

Cells according to the present invention operate as follows: On passing electric current through the electrodes oxygen is evolved at the anode or positive electrode. The evolved oxygen escapes into the gassing chambers provided in the cells. Said gassing chambers are in contact with metallic surface portions of the electrodes adjacent thereto and having an enlarged gas-contacting area. These gas-contacting areas are not immersed in the electrolyte but are merely covered by a thin electrolyte film. At said surface portions electrochemical reaction of the oxygen takes place and the oxygen is reconverted into the ionic state. Due thereto, the negative electrode is depolarized in such a manner that no hydrogen is evolved thereon.

The electrode potential of cells with alkaline electrolyte is between about 1.3 v. to 1.5 v. depending on the current intensity. For instance, the terminal voltage is 1.47 v. in button- or disc-like cells of a diameter of 25 mm. with an amperage of 10 ma. and in like cells of a diameter of 40 mm. the terminal voltage is 1.5 v. with an amperage of 20 ma.

The current density is, of course, dependent on the electrode surface. With button- or disc-like cells of a diameter of 25 mm. the current density is 2.5 ma./sq. cm. When using sintered electrodes, the current density is twice to three times as high.

The cells have practically no capacity, because the electrodes are substantially free of active material. Due to such a low capacity cells according to the present invention respond very rapidly after periods of non-operation, i.e., they attain very rapidly the charging voltage associated with the current intensity.

The direction of current can be reversed without damage to the cell provided care is taken that the evolved oxygen is in sufficient contact with the respective negative electrode.

I claim:
1. A hermetically sealed, electrolytic counter cell, com- prising, in combination, a housing; means for hermetically sealing said housing; two metal electrodes of potentially different polarity and substantially free of active material located in said housing; separator means between and in contact with adjacent surface portions of said electrodes of potentially different polarity, at least one of said electrodes having free surface portions partially defining a gas space within said housing; an electrolyte capillarily fixed in said separator means and forming a thin film on said free surface portion of said electrode; and a gas atmosphere in said housing consisting at least primarily of oxygen at the time the cell is hermetically sealed, whereby gases evolved during operation of said counter cell will reach said gas space and will be consumed in contact with said electrolyte film-covered surface portion of said electrode.

2. The counter cell of claim 1, wherein said electrolyte is an alkaline electrolyte and said gas-contacting and -consuming free surface portions are of roughened nickel.

3. The counter cell of claim 1, wherein said electrolyte is an alkaline electrolyte and said gas-contacting and -consuming free surface portions are of sintered nickel.

4. The counter cell of claim 1, wherein said electrolyte is an alkaline electrolyte and said gas-contacting and -consuming free surface portions are plated with nickel.

5. A hermetically sealed, electrolytic counter cell, comprising, in combination, a housing; means for hermetically sealing said housing; two metal electrodes of potentially different polarity and substantially free of active material located in said housing each of said electrodes having two main faces; separator means between and in contact with one of said main faces respectively of each of said electrodes of potentially different polarity, the other main face of at least one of said electrodes partially defining a gas space within said housing; an electrolyte capillarily fixed in said separator means and forming a thin film on said other main face of said electrode; and a gas atmosphere in said housing consisting at least primarily of oxygen at the time the cell is hermetically sealed, whereby gases evolved during operation of said counter cell will reach said gas space and will be consumed in contact with said electrolyte film-covered other main face of said electrode.

6. The counter cell of claim 5, wherein said separator is porous and impregnated with said electrolyte, the one main face of each adjacent electrode contacting the separator under moderate pressure.

7. The counter cell of claim 5, wherein the metal electrodes consist of metal sheets having a thickness of about 0.1 mm. to 2 mm.

8. The counter cell of claim 7, wherein the thickness of the electrodes is between about 0.2 mm. and 0.3 mm.

References Cited in the file of this patent

UNITED STATES PATENTS

| | | |
|---|---|---|
| 2,156,222 | Murphy | Aug. 25, 1939 |
| 2,681,375 | Vogt | June 15, 1954 |
| 2,724,733 | Hagsphil et al. | Nov. 22, 1955 |
| 2,857,447 | Lindstrom | Oct. 21, 1958 |
| 2,862,986 | Strauss | Dec. 2, 1958 |

FOREIGN PATENTS

| | | |
|---|---|---|
| 741,345 | Great Britain | Nov. 30, 1955 |

OTHER REFERENCES

Vinal: Storage Batteries, 1940, 3rd ed., John Wiley & Sons, pp. 282–284.